US006638610B1

(12) United States Patent
Yao

(10) Patent No.: US 6,638,610 B1
(45) Date of Patent: Oct. 28, 2003

(54) WATER AND OIL REPELLENT POROUS MATERIALS AND PROCESSES FOR MAKING THE SAME

(75) Inventor: Li Yao, Peachtree City, GA (US)

(73) Assignee: Porex Technologies Corp., Fairburn, GA (US)

(*) Notice: Subject to any disclaimer, the term of this patent is extended or adjusted under 35 U.S.C. 154(b) by 0 days.

(21) Appl. No.: 09/519,590

(22) Filed: Mar. 6, 2000

(51) Int. Cl.[7] ............................ B32B 3/26; B32B 27/14

(52) U.S. Cl. .................... 428/304.4; 428/341; 428/421; 428/523

(58) Field of Search ................................ 428/421, 523, 428/304.4, 341

(56) References Cited

U.S. PATENT DOCUMENTS

| | | | | |
|---|---|---|---|---|
| 4,606,737 A | | 8/1986 | Stern | |
| 4,668,726 A | | 5/1987 | Howells | |
| 4,902,529 A | | 2/1990 | Rebham et al. | |
| 5,156,780 A | | 10/1992 | Kenigsberg et al. | |
| 5,260,360 A | | 11/1993 | Mrozinski et al. | |
| 5,352,513 A | | 10/1994 | Mrozinski et al. | |
| 5,516,337 A | | 5/1996 | Nguyen | |
| 5,690,949 A | | 11/1997 | Weimer et al. | |
| 5,738,111 A | | 4/1998 | Weimer et al. | |
| 5,853,894 A | | 12/1998 | Brown | |
| 5,981,614 A | | 11/1999 | Adiletta | 521/145 |
| 6,143,675 A | * | 11/2000 | McCollam et al. | 442/221 |
| 6,196,708 B1 | | 3/2001 | Rogers | |
| 6,410,084 B1 | * | 6/2002 | Klare et al. | 427/244 |
| 6,447,919 B1 | * | 9/2002 | Brown et al. | 428/442 |
| 6,486,245 B1 | | 11/2002 | Thünemann et al. | |
| 6,486,291 B2 | | 11/2002 | Mrozinski et al. | |

OTHER PUBLICATIONS

Donald L. Schmidt, Charles E. Coburn* , Benjamin M. DeKovent, Gregg E. Potter, Gregory F. Meyers and Daniel A. Fischer, Water–based non–stick hydrophobic coatings, Letters to Nature, vol. 368, Mar. 3, 1994.

* cited by examiner

*Primary Examiner*—H. Thi Le
(74) *Attorney, Agent, or Firm*—Pennie & Edmonds, LLP

(57) ABSTRACT

This invention relates to a hydrophobic and oleophobic porous materials and processes for making the same. In a first process of the invention, a thermoplastic substrate is at least partially coated and/or impregnated with a surface treatment material. In a second process of the invention, thermoplastic particles which comprise a surface treatment material are sintered together. Preferred surface treatment materials are fluorochemicals.

10 Claims, No Drawings

WATER AND OIL REPELLENT POROUS MATERIALS AND PROCESSES FOR MAKING THE SAME

1. FIELD OF THE INVENTION

The invention relates to hydrophobic and/or oleophobic porous materials and to processes for making the same.

2. BACKGROUND OF THE INVENTION

Materials that repel water (i.e., hydrophobic materials) and materials that repel oils (i.e., oleophobic materials) are useful in a variety of applications. For example, U.S. Pat. No. 5,853,894 discloses a method that allegedly increases the ability of laboratory vessels, such as test tubes and graduated cylinders, to repel water and oils. See also, Schmidt, D. L., et al., *Nature* 368:39–41 (1994); and Brady, R. F., *Nature* 368:16–17 (1994).

In other applications, porous (i.e., gas permeable) hydrophobic and oleophobic materials are desired. For example, such materials may be used to provide vents or filters that allow the passage of gases but resist the passage of liquids. Porous hydrophobic and oleophobic materials may also be used to prevent the transmission of viral pathogens. See, e.g., U.S. Pat. Nos. 5,690,949 and 5,738,111. Until now, however, attempts at providing hydrophobic and oleophobic porous materials have yielded materials of limited use.

In one prior method of providing a porous hydrophobic material, a porous substrate is coated with silicone oil. Although materials with surface energies as low as 25 to 30 dynes/cm can be obtained by this method, large amounts (e.g., greater than two percent by weight of the material) of silicone oil are often required. More important, because silicone oil can easily leach from these materials, they are of little use in applications that require a contaminate-free environment.

An alternate method of providing an allegedly hydrophobic porous material is disclosed by U.S. Pat. No. 5,156,780. According to this method, a microporous substrate is impregnated with a solution containing a fluorinated monomer, after which the carrier solvent is evaporated and the monomers are polymerized in situ to form a coating.

Another method of providing an allegedly hydrophobic porous material is disclosed by U.S. Pat. Nos. 5,260,360 and 5,352,513. According to this method, a microporous material is made by stretching a phase-separated membrane. Unfortunately, this method is of little use in providing hydrophobic and oleophobic materials that have desirable mechanical properties such as stiffness and strength.

In view of the inadequacies of prior porous materials, there exists a need for porous hydrophobic and/or oleophobic materials that can be used in a wide range of applications. There further exists a need for low cost, efficient methods of making porous hydrophobic and/or oleophobic materials.

3. SUMMARY OF THE INVENTION

This invention is directed to porous hydrophobic and/or oleophobic materials and methods of their manufacture and use. Particular materials of the invention comprise a porous thermoplastic substrate and a surface treatment material. The invention is further directed to methods of using the novel porous materials disclosed herein, as well as to filters, vents, and pipette tips made of, or comprising, the novel porous materials disclosed herein.

Preferred hydrophobic and/or oleophobic materials of the invention have a surface energy of from about 5 dynes/$cm^2$ to about 30 dynes/$cm^2$, more preferably from about 6 dynes/$cm^2$ to about 20 dynes/$cm^2$, and most preferably from about 6 dynes/$cm^2$ to about 15 dynes/$cm^2$.

Suitable thermoplastics that can be used to provide porous thermoplastic substrates of the invention include, but arc not limited to, polyolefins, nylons, polycarbonates, poly(ether sulfones), and mixtures thereof. A preferred thermoplastic is a polyolefin. Examples of suitable polyolefins include, but are not limited to: ethylene vinyl acetate; ethylene methyl acrylate; polyethylenes; polypropylenes; ethylene-propylene rubbers; ethylene-propylene-diene rubbers; poly(1-butene); polystyrene; poly(2-butene); poly(1-pentene); poly(2-pentene); poly(3-methyl-1-pentene); poly(4-methyl-1-pentene); 1,2-poly-1,3-butadiene; 1,4-poly-1,3-butadiene; polyisoprene; polychloroprene; poly(vinyl acetate); poly(vinylidene chloride); and mixtures and derivatives thereof. A preferred polyolefin is polyethylene. Examples of suitable polyethylenes include, but are not limited to, low density polyethylene, linear low density polyethylene, high density polyethylene, ultra-high molecular weight polyethylene, and derivatives thereof.

A first embodiment of the invention encompasses a porous hydrophobic and/or oleophobic material which comprises a sintered porous thermoplastic substrate having a surface at least part of which is coated with a surface treatment material.

Although the thermoplastic substrate can be made of any thermoplastic, including those disclosed herein, it is preferably made of polyethylene, more preferably ultra-high molecular weight polyethylene. Preferred surface treatment materials include, but are not limited to, fluorochemicals. Preferred fluorochemicals are high molecular weight fluorochemicals polymerized from compounds such as, but not limited to, fluorinated acrylates, methacrylates, acrylic esters, and mixtures thereof. Specific preferred fluorochemicals are high molecular weight fluorochemicals polymerized from compounds such as:

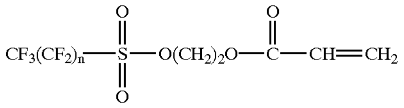

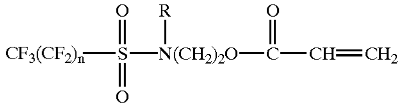

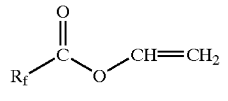

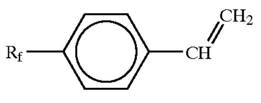

-continued

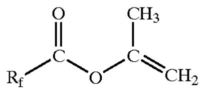

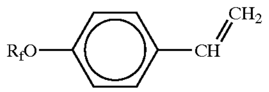

and mixtures thereof, wherein each $R_f$ is independently —$CF_3(CF_2)_n$, each n is independently an integer of from about 1 to about 18, preferably of from 1 to 4, and R is hydrogen or substituted or unsubstituted alkyl, aryl, or aralkyl.

A specific porous hydrophobic and/or oleophobic material of the invention thus comprises a sintered porous thermoplastic substrate having a surface at least part of which is coated with a surface treatment material, wherein the porous thermoplastic substrate is ultra-high molecular weight polyethylene and the surface treatment material is a perfluoro polyacrylate. Specific preferred perfluoro polyacrylates are polymerized from compounds such as:

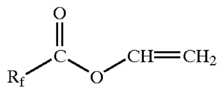

and

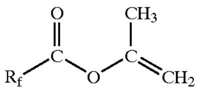

wherein $R_f$ is —$CF_3(CF_2)_n$, and n is an integer of from about 1 to about 18, preferably of from 1 to 4.

A second embodiment of the invention encompasses a porous hydrophobic and/or oleophobic material which comprises a sintered porous thermoplastic substrate and a surface treatment material disposed throughout at least part of the substrate.

Although the thermoplastic substrate can be made of any thermoplastic, including those disclosed herein, it is it is preferably polyethylene. Preferred surface treatment materials include, but are not limited to, fluorochemicals. Preferred fluorochemicals are low molecular weight fluorochemicals such as, but not limited to, fluorinated urethanes, allophanates, oxazolidones, piperazines, and mixtures thereof. Specific preferred low molecular weight fluorochemicals include, but are not limited to, those of the formula:

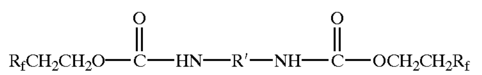

wherein each $R_f$ is independently —$CF_3(CF_2)_n$, n is an integer of from about 1 to about 18, preferably of from 1 to 4, and R' can by any suitable organic moiety including, but not limited to:

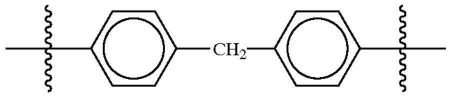

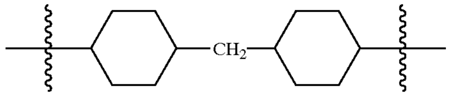

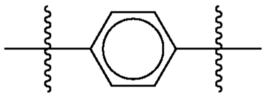

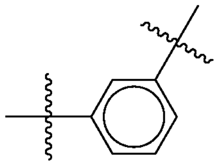

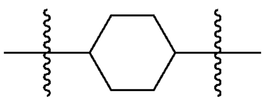

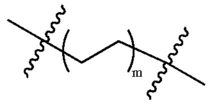

and derivatives thereof, wherein m is an integer of from about 1 to about 20, preferably of from 1 to 6.

A specific porous hydrophobic and/or oleophobic material of the invention thus comprises a sintered porous thermoplastic substrate and a surface treatment material disposed within at least part of the sintered porous thermoplastic substrate, wherein the porous thermoplastic substrate is polyethylene and the surface treatment material is of the formula:

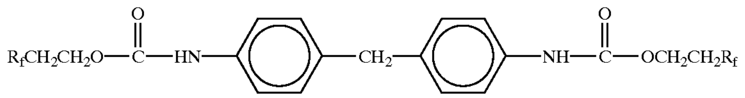

wherein each $R_f$ is independently —$CF_3(CF_2)_n$, and n is an integer of from about 1 to about 18, preferably of from 1 to 4. In an even more specific material of the invention, the surface treatment material is disposed uniformly within at least about 75 percent, more preferably at least about 90 percent, and most preferably at least about 95 percent of the porous thermoplastic substrate.

A third embodiment of the invention encompasses a particle comprised of surface treatment material disposed about a thermoplastic core. Preferred surface treatment materials are low molecular weight fluorochemicals such as those described herein. Although the thermoplastic core can be made of any thermoplastic, it is preferably made of polyethylene.

A specific particle of the invention thus comprises a surface treatment material of the formula:

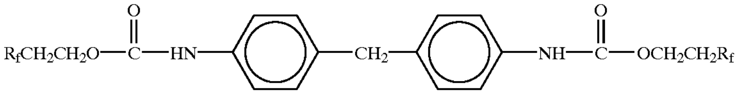

disposed about a polyethylene core, wherein each $R_f$ is independently $—CF_3(CF_2)_n$, and n is an integer of from about 1 to about 18, preferably of from 1 to 4. A specific particle of the invention has a diameter of from about 5 μM to about 1000 μM, more preferably from about 10 μM to about 500 μM, and most preferably from about 20 μM to about 300 μM.

A fourth embodiment of the invention encompasses a process for making a porous hydrophobic and/or oleophobic material, and the products of that process. The process comprises contacting a sintered porous thermoplastic substrate with a surface treatment material, or a solution (e.g., a liquid or aerosol), suspension or powder comprising a surface treatment material, to provide a coated and/or impregnated substrate which is optionally dried and/or treated. Optional treatment includes, but is not limited to, radiation- and chemical-induced crosslinking. Preferred surface treatment materials are fluorochemicals, and more preferred surface treatment materials are high molecular weight fluorochemicals.

A fifth embodiment of the invention encompasses a process for making a particle and the products of that process. The process comprises cooling a molten pre-particle, wherein the pre-particle is comprised of a thermoplastic and a surface treatment material. Preferably, the molten pre-particle is formed by chopping a molten extrudate. Preferably, the pre-particle is cooled under a coolant such as, but not limited to, water. Preferably, the surface treatment material is a fluorochemical, more preferably a low molecular weight fluorochemical.

A sixth embodiment of the invention encompasses a process for making a porous hydrophobic and/or oleophobic material and the products of that process. This process comprises sintering particles which are comprised of a surface treatment material disposed about a thermoplastic core. Preferred surface treatment materials are low molecular weight fluorochemicals such as those described herein. Although the thermoplastic core can be made of any thermoplastic, including those disclosed herein, it is it is preferably polyethylene. Preferred particles are formed by cooling a molten pre-particle comprised of a thermoplastic and a surface treatment material.

3.1 DEFINITIONS

As used herein to describe a particle, the term "substantially spherical" means that the particle is spherical or that the length of its longest radius is no greater than about 2.0 times, more preferably no greater than about 1.5 times, even more preferably no greater than about 1.2 times the length of its shortest radius. When used to describe a mixture or collection of particles, the term "substantially spherical" means that greater than about 50%, more preferably greater than about 75%, even more preferably greater than about 90%, and most preferably greater than about 95% of the particles are substantially spherical.

As used herein, the term "substantial portion" means greater than about 80%, more preferably greater than about 90%, and most preferably greater than about 95%.

As used herein, the terms "degradation temperature" and "decomposition temperature" mean the temperature at which a particular chemical compound (e.g., a surface treatment material) decomposes or loses its ability to repel water and/or oil. As those skilled in the art will recognize, the degradation temperature of a particular material will vary as a function of, for example, pressure and exposure to oxidants, reductants, or other reactive chemical moieties.

As used herein, the term "substantial degradation" means the degradation of a substantial portion of the material described.

As used herein to describe a compound or moiety, the term "derivative" means a compound or moiety wherein the degree of saturation of at least one bond has been changed (e.g., a single bond has been changed to a double or triple bond) or wherein at least one hydrogen atom has been replaced with a different atom or with a chemical moiety. Examples of different atoms and chemical moieties include, but are not limited to, alkyl, aryl, halogen, oxygen, nitrogen, sulfur, hydroxy, methoxy, alkyl, amine, amide, ketone, and aldehyde.

As used herein, the term "surface treatment material" refers to a material which is or which comprises a compound or mixture of compounds that, when disposed on the surface of a material, will reduce its surface energy. The term "surface treatment material" also encompasses materials that require further processing after having been disposed on the surface of a material in order to reduce its surface energy. Examples of further processing include, but are not limited to, chemical- or radiation-induced crosslinking and the formation of chemical.

4. DETAILED DESCRIPTION OF THE INVENTION

This invention is directed to novel porous materials that repel water and/or oil. The materials of the invention can be molded or formed into any of a variety of shapes, and can thus be used to provide, for example, filters or vents that are useful in a variety of medical, research, consumer and industrial applications. The mechanical strength and uniform porosity of specific materials of the invention further enable their use in applications for which prior hydrophobic and oleophobic materials arc not suited. For example, pipette tips can be made from the materials of this invention. Examples of pipette tips include those disclosed by U.S. Pat. Nos. 5,156,811 and 5,364,595, both of which are incorporated herein by reference.

The specific properties of a particular porous material of the invention will depend on its specific composition and structure. These, in turn, depend on the materials and processes used in the manufacture of the porous material.

4.1. MATERIALS

Porous materials of the invention comprise a porous substrate and a surface treatment material. The surface treatment material can be disposed on the exterior of the porous substrate, within its interior, or both.

Using methods such as, but not limited to, those described herein, porous substrates are made from at least one type of thermoplastic. Examples of suitable thermoplastics include, but arc not limited to, polyolefins, nylons, polycarbonates, and poly(ether sulfones). Preferred thermoplastics are polyolefins.

Examples of polyolefins suitable for use in the invention include, but are not limited to: ethylene vinyl acetate (EVA); ethylene methyl acrylate (EMA); polyethylenes such as, but not limited to, low density polyethylene (LDPE), linear low density polyethylene (LLDPE), high density polyethylene (HDPE), and ultra-high molecular weight polyethylene (UHMWPE); polypropylenes; ethylene-propylene rubbers; ethylene-propylene-diene rubbers; poly(1-butene); polystyrene; poly(2-butene); poly(1-pentene); poly(2-pentene); poly(3-methyl-1-pentene); poly(4-methyl-1-pentene); 1,2-poly-1,3-butadiene; 1,4-poly-1,3-butadiene; polyisoprene; polychloroprene; poly(vinyl acetate); poly(vinylidene chloride); and mixtures and derivatives thereof. Specific EVA materials include, but are not limited to, those in the Microthene MU® and Microthene FE® series manufactured by Equistar, Houston, Tex., such as Microthene MU 763-00 (9% vinyl acetate) and Microthene FE 532-00 (9% vinyl acetate). Specific EMA materials include, but are not limited to, those in the Optema TC® series manufactured by Exxon Chemical Company, Baton Rouge, La., such as Optema TC-110 (21.5% methyl acrylate). Specific polyethylene materials include, but are not limited to, those in the Exact® series manufactured by Exxon Chemical Company, such as Exact SLX-9090, Exact 3024, Exact, 3030, Exact 3033, Exact 4011, Exact 4041, Exact SLP-9053, Exact SLP-9072, and Exact SLP-9095. Specific examples of LDPE include, but are not limited to, those in the 20 series manufactured by DuPont Chemical Company, Wilmington, Del., such as 20 series 20, 20 series 20–6064, 20 series 2005, 20 series 2010, and 20 series 2020T. Specific examples of LLDPE include, but are not limited to, those in the Exact® series manufactured by Exxon Chemical Company, such as Exact 3022 and Exact 4006. Specific examples of HDPE include, but are not limited to, those in the Escorene HX® series manufactured by Exxon Chemical Company, such as Escorene HX-0358.

Ultra-high molecular weight polyethylenes suitable for use in the invention include, but are not limited to, UHMWPE having a molecular weight greater than about 1,000,000. Typically, UHMWPE displays no measurable flow rate under normal test procedures. See, U.S. Pat. No. 3,954,927, which is incorporated herein by reference. Ultra-high molecular weight polyethylene also tends to have enhanced mechanical properties compared to other polyethylenes, including, but not limited to, abrasion resistance, impact resistance and toughness. Polyethylenes having weight average molecular weights of 1,000,000 or higher, which are included within the class designated as UHMWPE, typically an intrinsic viscosity in the range of about 8 or more. Specific examples of UHMWPE include, but are not limited to, Hostalen GUR® sold by Ticona Inc., League City, Tex.

Polypropylenes suitable for use in the invention include, but are not limited to: the Polyfort® series manufactured by A Shulman Co., Akron, Ohio, such as FPP 2320E, 2321E, 2322E, 2345E, PP2130, and PP2258; the Acctuf® series manufactured by BP Amoco Corporation, Atlanta, Georgia, such as Acctuf 3045, Amoco 6014, and Amoco 6015; the Aristech® series manufactured by Aristech Chemical Corp., Pittsburgh, Pa., such as D-007-2, LP-230-S, and TI-4007-A; the Borealis® series manufactured by BASF Thermoplastic Materials, Saint Paul, Minn., such as BA101E, BA110E, BA122B, BA204E, BA202E, and BA124B; the Polypro® series manufactured by Chisso America Inc., Schaumburg, Ill., such as F1177 and F3020; the Noblen® series manufactured by Mitsubishi Petrochemical Co. Ltd., Tokyo, Japan, such as MA8; the Astryn® series manufactured by Montell USA Inc., Wilmington, Del., such as 68F4-4 and PD451; the Moplen® series manufactured by Montell USA Inc., such as D 50S, D 60P, and D 78PJ; and the Pro-Fax® series manufactured by Montell USA Inc., such as 6723, 6823, and 6824.

Sinterable thermoplastics in addition to those recited herein can also be used in this invention. As those skilled in the art are well aware, the ability of a thermoplastic to be sintered can be determined, at least in part, from its melt flow index (MFI). Melt flow indices of individual thermoplastics are known or can be readily determined by methods well known to those skilled in the art. For example, the extrusion plastometer made by Tinius Olsen Testing Machine Company, Willow Grove, Pa., can be used. As discussed elsewhere herein, the MFIs of thermoplastics suitable for use in this invention will depend on the particular porous thermoplastic material and/or the method used to prepare it. In general, however, the MFI of a thermoplastic suitable for use in the materials and methods of the invention is from about 0 to about 15, more preferably from about 0.2 to about 12, and most preferably from about 0.5 to about 10. The temperatures at which individual thermoplastics sinter (i.e., their sintering temperatures) are also well known, or can be readily determined by routine methods such as, but not limited to, thermal mechanical analysis and dynamic mechanical thermal analysis.

The materials of this invention next comprise a surface treatment material. Preferred surface treatment materials are fluorochemicals. Depending on the material and method of the invention, preferred fluorochemicals are either high or low molecular weight fluorochemicals.

High molecular weight fluorochemicals typically have a molecular weight greater than about $10^4$, more preferably greater than about $10^5$, and most preferably greater than about $10^6$ grams/mole. Mixtures of high molecular weight fluorochemicals typically have an average molecular greater than about $10^4$, more preferably greater than about $10^5$, and most preferably greater than about $10^6$.

Examples of high molecular fluorochemicals that can be used in the materials and processes of the invention include, but are not limited to, fluorinated acrylates, methacrylates, acrylic esters, and mixtures thereof.

Examples of fluorinated acrylates include, but are not limited to, perfluorohexyl acrylates. Specific, commercially available fluorinated acrylates suitable for use in this invention include, but are not limited to: those disclosed in U.S. Pat. Nos. 4,954,256, 5,156,780, and 5,853,894, each of which is incorporated herein by reference; those sold under the tradenames PerFluoroCoat® and FluoroPel® by Cytonix Corporation, Beltsville, Md.; Fluorad® FC-722, FC-724, FC-725, and FC-732, and Fluorel® FC-2174 and FC-2181, all of which are sold by the Commercial Chemicals Divisions of 3M Corporation, St. Paul, Minn. Suitable fluorinated acrylates can also be prepared by methods well known to those skilled in the art using starting materials such as, but not limited to: Zonyl® TA-N, sold by DuPont Dow Elastomers, Wilmington, Del.; and FX-13 and FX-189 sold by the Commercial Chemicals Divisions of 3M Corporation.

Examples of fluorinated methacrylates include, but are not limited to, perfluorohexyl methacrylate, perfluoroheptyl mcthacrylate, perfluoroocytyl methacrylate, perfluorononyl methacrylate, perfluorodecyl methacrylate, perfluoroundecyl methacrylate, perfluorododecyl methacrylate, and mixtures thereof. Specific, commercially available fluorochemical methacrylates that can be used in the materials and methods of the invention include, but are not limited to, those prepared from the monomer sold under the tradename FX-14 by the Commercial Chemicals Divisions of 3M Corporation.

Examples of fluorinated acrylic esters include, but are not limited to, acrylic esters comprising a perfluoropolyoxyalkylene moiety such as described in U.S. Pat. No. 4,681,925, which is incorporated herein by reference.

Preferred high molecular weight fluorochemicals include, but are not limited to, these sold under the tradenames Fluorad® FC-722 and FluoroPel®.

Low molecular weight fluorochemicals, some of which are referred to as "waxes," are fluorochemicals that are not high molecular weight fluorochemicals. Mixtures of low molecular weight fluorochemicals are mixtures of fluorochemicals that are not mixtures of high molecular weight fluorochemicals. Low molecular weight fluorochemicals typically have a molecular weight of less than about $10^4$, more preferably from about 8000 to about 2000 grams/mole. Mixtures of low molecular weight fluorochemicals typically have an average molecular weight of less than about $10^4$, more preferably from about 8000 to about 2000.

Examples of low molecular fluorochemicals (e.g., fluorowaxes) that can be used in the materials and methods of the invention include, but are not limited to: those disclosed by U.S. Pat. Nos. 4,668,726, 5,156,780, 5,342,434, and 5,853,894, each of which is incorporated herein by reference; and fluorinated urethanes, allophanates, oxazolidinones, and piperazines, and mixtures thereof.

Specific, commercially available fluorinated urethanes include those sold under the tradenames FX-1801 and FX-1808 by the Commercial Chemical Division of 3M Corporation, St. Paul, Minn.

Methods well known in the art can also be used to provide fluorinated urethanes such as, but not limited to, those of the formula:

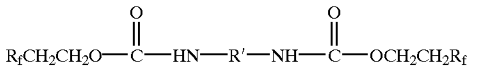

wherein each $R_f$ is independently $—CF_3(CF_2)_n$, n is an integer of from about 1 to about 18, preferably of from 1 to 4, and R' can be any suitable organic moiety including, but not limited to:

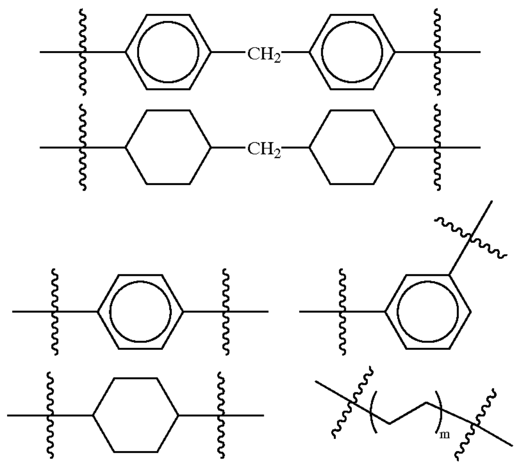

and derivatives thereof, wherein m is an integer of from about 1 to about 20, preferably of from 1 to 6. Fluorinated urethanes such as these can be prepared from starting materials such as, but not limited to, methylene-di-p-phenyl diisocyanate, available from Eastman Kodak Corp., Rochester, N.Y., and perfluoroalkyl alkyl alcohols such as perfluoroalkyl ethyl alcohol, which is sold under the tradename Zonyl BA-N® by DuPont Dow Elastomers, Wilmington, Del.

Examples of fluorinated oxazolidinones include, but are not limited to, those disclosed by U.S. Pat. Nos. 5,025,052, 5,352,513, 5,690,949, and 5,738,111, each of which is incorporated herein by reference. Suitable fluorinated oxazolidinones can also be prepared by methods known to those skilled in the art. For example, suitable fluorinated oxazolidinones can be prepared by reactions such as, but not limited to:

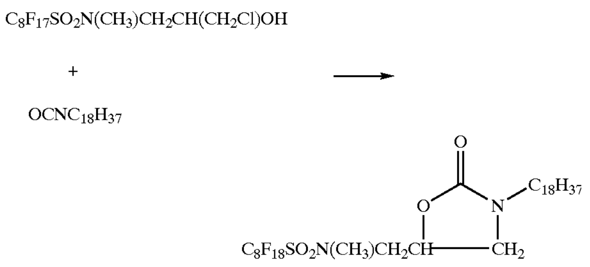

Examples of fluorinated allophanates include, but are not limited to, those disclosed by U.S. Pat. No. 4,606,737, which is incorporated herein by reference. Suitable fluorinated allophanates can also be prepared by methods known to those skilled in the art from starting materials such as, but not limited to:

$C_8F_{17}SO_2N(C_2H_5)CH_2CH_2OH$ and

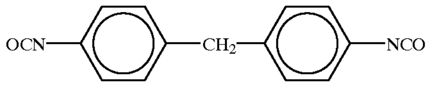

Preferred low molecular weight fluorochemicals include, but are not limited to, those sold under the tradenames FX-1801 and FX-1808.

The porous materials of the invention can optionally comprise materials in addition to surface treatment materials. These additional materials are typically incorporated within the porous substrate, but can also be used to provide a coating or external layer. Examples of optional additional ingredients include, but are not limited to, lubricants, colorants, and fillers. Examples of fillers include, but are not limited to, carbon black, cellulose fiber powder, siliceous fillers, polyethylene fibers and filaments, and mixtures thereof. Specific polyethylene fibers and filaments include, but are not limited to, those disclosed by U.S. Pat. Nos. 5,093,197 and 5,126,219, each of which is incorporated herein by reference.

Using materials such as, but not limited to, those described herein, novel porous thermoplastic materials of the invention can be made using any technique known in the art. It is preferred, however, that they be made using at least one of the processes disclosed herein. In a first of these processes, a porous thermoplastic substrate is contacted with at least one surface treatment material. In a second process, thermoplastic particles that comprise at least one surface treatment material are sintered together.

4.2. COATING- OR IMPREGNATING POROUS SUBSTRATES

In a first process of the invention, a porous thermoplastic substrate is contacted with at least one surface treatment material. Preferably, the porous thermoplastic substrate is made by sintering together thermoplastic particles.

Preferred thermoplastic particles have an average diameter of from about 5 μM to about 1000 μM, more preferably from about 10 μM to about 500 μM, and most preferably from about 20 μM to about 300 μM. It is also preferred that the particles are all of about the same size. In other words, it is preferred that the particles' size distribution be narrow (e.g., as determined using commercially available screens). It has been found that particles of about the same size can be consistently packed into molds. A narrow particle size distribution further allows the production of a substrate with uniform porosity (i.e., a substrate comprising pores that are evenly distributed throughout it and/or are of about the same size). This is advantageous because solutions and gases tend to flow more evenly through uniformly porous filters and vents than through filters and vents which contain regions of high and low permeability. Uniformly porous substrates are also less likely to have structural weak spots than substrates that comprise unevenly distributed pores of substantially different sizes. In view of these benefits, if a thermoplastic is commercially available in powder (i.e., particulate) form, it is preferably screened prior to use to ensure a desired average size and size distribution. However, most thermoplastics are not commercially available in powder form, and must therefore be converted into powder form by methods well known to those skilled in the art such as, but not limited to, cryogenic grinding and underwater pelletizing.

Cryogenic grinding can be used to prepare thermoplastic particles of varying sizes. But because cryogenic grinding provides little control over the sizes of the particles it produces, powders formed using this technique can be screened to ensure that the particles to be sintered arc of a desired average size and size distribution.

Underwater pelletizing can also be used to form thermoplastic particles suitable for sintering. Although typically limited to the production of particles having diameters of greater than about 36 μM, underwater pelletizing offers several advantages. First, it provides accurate control over the average size of the particles produced, in many cases thereby eliminating the need for an additional screening step and reducing the amount of wasted material. A second advantage of underwater pelletizing, which is discussed further herein, is that it allows significant control over the particles' shape.

Underwater pelletizing is described, for example, in U.S. patent application Ser. No. 09/064,786, filed Apr. 23, 1998, and U.S. provisional patent application No. 60/044,238, filed Apr. 24, 1999, both of which are incorporated herein by reference. Thermoplastic particle formation using underwater pelletizing typically requires an extruder or melt pump, an underwater pelletizer, and a drier. The thermoplastic resin is fed into an extruder or a melt pump and heated until semi-molten. The semi-molten material is then forced through a die. As the material emerges from the die, at least one rotating blade cuts it into pieces herein referred to as "pre-particles." The rate of extrusion and the speed of the rotating blade(s) determine the shape of the particles formed from the pre-particles, while the diameter of the die holes determine their average size. Water, or some other liquid or gas capable of increasing the rate at which the pre-particles cool, flows over the cutting blade(s) and through the cutting chamber. This coagulates the cut material (i.e., the pre-particles) into particles, which are then separated from the coolant (e.g., water), dried, and expelled into a holding container.

The average size of particles produced by underwater pelletizing can be accurately controlled and can range from about 0.014" (35.6 μM) to about 0.125" (318 μM) in diameter, depending upon the thermoplastic. Average particle size can be adjusted simply by changing dies, with larger pore dies yielding proportionally larger particles. The average shape of the particles can be optimized by manipulating the extrusion rate and the temperature of the water used in the process.

While the characteristics of a porous material can depend on the average size and size distribution of the particles used to make it, they can also be affected by the particles' average shape. Consequently, in another embodiment of the invention, the thermoplastic particles are substantially spherical. This shape provides specific benefits. First, it facilitates the efficient packing of the particles within a mold. Second, substantially spherical particles, and in particular those with smooth edges, tend to sinter evenly over a well defined temperature range to provide a final product with desirable mechanical properties and porosity.

In a specific embodiment of the invention, the thermoplastic particles are substantially spherical and free of rough edges. Consequently, if the thermoplastic particles used in this preferred method are commercially available, they are thermal fined to ensure smooth edges and screened to ensure a proper average size and size distribution. Thermal fining, which is well known to those skilled in the art, is a process wherein particles are rapidly mixed and optionally heated such that their rough edges become smooth. Mixers suitable for thermal fining include the W series high-intensity mixers available from Littleford Day, Inc., Florence, Ky.

Thermoplastic particles made using cryogenic grinding are likewise preferably thermal fined to ensure smooth edges and screened to ensure a proper average size and size distribution. Advantageously, however, if the particles are made using underwater pelletizing, which allows precise control over particle size and typically provides smooth, substantially spherical particles, subsequent thermal fining and screening are typically not required.

Once thermoplastic particles of a desired average size and/or shape have been obtained, they are optionally combined with additional materials such as, but not limited to, lubricants, colorants, and fillers such as those described above in Section 4.1. As those skilled in the art will recognize, the types and amounts of optional materials incorporated into a porous substrate will typically depend on the application for which the final porous hydrophobic and/or oleophobic material will be used.

After the thermoplastic particles and optional additional materials have been blended, preferably to provide a uniform mixture, the mixture is sintered. Depending on the desired size and shape of the final product (e.g., a block, tube, cone, cylinder, sheet, or membrane), this can be accomplished using a mold, a belt line such as that disclosed by U.S. Pat. No. 3,405,206, which is hereby incorporated by reference, or using other techniques known to those skilled in the art. In a preferred embodiment of the invention, the mixture is sintered in a mold. Suitable molds are commercially available and are well known to those skilled in the art. Specific examples of molds include, but are not limited to, flat sheets with thickness ranging from about ⅛ inch to about 0.5 inch, round cylinders of varying heights and diameters, and small conical parts molded to fit snugly into a pipette tip. Suitable mold materials include, but are not limited to, metals and alloys such as aluminum and stainless steel, high temperature thermoplastics, and other materials both known in the art and disclosed herein.

In a specific embodiment of the invention, a compression mold is used to provide the sintered material. In this embodiment, the mold is heated to the sintering temperature, allowed to equilibrate, and then subjected to pressure. This pressure typically ranges from about 1 psi to about 10 psi, depending on the composition of the mixture being sintered and the desired porosity of the final product. In general, the greater the pressure applied to the mold, the smaller the average pore size and the greater the mechanical strength of the final product. The duration of time during which the pressure is applied also varies depending on the desired porosity of the final product, and is typically from about 2 to about 10, more typically from about 4 to about 6 minutes. In another embodiment of the invention, the thermoplastic particles are sintered in a mold without the application of pressure.

Once the porous substrate has been formed, the mold is allowed to cool. If pressure has been applied to the mold, the cooling can occur while it is still being applied or after it has been removed. The substrate is then removed from the mold and optionally processed. Examples of optional processing include, but are not limited to, sterilizing, cutting, milling, polishing, encapsulating, coating, and combinations thereof.

The substrate is then coated and/or impregnated with at least one surface treatment material, or a mixture comprising at least one surface treatment material. Any method can be used in this process, including spraying, dipping, immersing, and pouring. But whatever the method, the surface treatment materials used in this embodiment of the invention are preferably high molecular weight fluorochemicals.

Although some surface treatment materials are liquid at temperatures suitable for coating and/or impregnating the porous substrate, many fluorochemicals typically are not. Consequently, it may be preferred that a surface treatment material be dissolved in a solvent to form a mixture, which is then contacted with the substrate, after with the coated and/or impregnated substrate is dried to provide a porous material of the invention. Any solvent in which a surface treatment material is soluble can be used. Such solvents are either known, or are easily determined using only routine experimentation. For example, many low molecular weight fluorochemicals are soluble in organic solvents such as, but not limited to, alcohols, methylene chloride, acetone, and mixtures thereof.

Although any of the fluorochemicals disclosed herein can be used in this method, preferred fluorochemicals are high molecular weight fluorochemicals. These compound, however, typically are not soluble in conventional organic solvents. Many high molecular weight fluorochemicals are, however, soluble in fluorinated solvents. Thus, preferred solvents used in this embodiment of the invention include, but are not limited to, 1,3-dichloro-1,1,2,2,3-pentafluoropropane, 1,1,1,2,3,4,4,5,5,5-decafluoropentane, and mixtures thereof. Example of suitable commercially available fluorinated solvents include, but are not limited to, that sold under the tradename Vertvel® by DuPont Chemical Company, Wilmington, Del., and that sold under the tradename ASAHIKLIN AK-225 by Asahi Glass Fluoropolymers USA Inc., Chadds Ford, Pa.

4.3. SINTERING PARTICLES THAT COMPRISE A SURFACE TREATMENT MATERIAL

In a second process of the invention, a surface treatment material is incorporated into the porous thermoplastic substrate during, rather than after, the sintering process. This process provides several advantages. First, it can be used to locate surface treatment material(s) within the porous material, and in particular at places or depths within the material that may be inaccessible using dipping or coating methods. Second, this process can be used to ensure that the distribution of surface treatment material(s) within the final material is uniform; e.g., that the density of a surface treatment material is uniform throughout the material. A third advantage of this process is that it can be used to trap surface treatment materials within pores that have small openings.

This process of the invention comprises the sintering of thermoplastic particles which comprise at least one surface treatment material (referred to herein as "thermoplastic surface treatment particles" or "PST particles"), optionally with thermoplastic particles that do not comprise surface treatment and/or additional materials such as those described above in Section 4.1.

In a first specific embodiment of this process, a thermoplastic resin comprising at least one surface treatment material is cryogenically ground and optionally screened and/or thermal fined to provide particles which can be sintered as described above in Section 4.2. In a specific embodiment of this process, each of the PST particles is approximately the same size. In another specific embodiment of this process, the PST particles are substantially spherical.

If the PST particles are combined with particles of other thermoplastics and/or other materials such as lubricants, colorants and fillers, it is preferred that the combination be mixed to ensure that the components are evenly distributed. The resulting mixture is then sintered to provide a porous material that uniformly hydrophobic and/or oleophobic.

Suitable sintering conditions are known in the art and include, for example, those described above in Section 4.2. However, because some surface treatment materials may decompose under particular sintering conditions, those skilled in the art will recognize that the thermoplastic, the sintering conditions, and/or the surface treatment material will have to be selected to provide a porous thermoplastic product of the invention that is capable of repelling water and/or oils to a desired degree. For example, a thermoplastic with a low MFI or sintering temperature can be selected such that the sintering temperature will not cause the decomposition of a desired surface treatment material. Alternatively, a temperature-resistant surface treatment material may be selected if the preferred thermoplastic sinters only at high temperatures.

In a second specific embodiment of this process, PST particles are formed by underwater pelletizing. These particles are thus preferably made by heating and mixing at least one thermoplastic, at least one surface treatment material, and any optional materials, to provide a molten mixture which can be extruded and formed into pellets according to the method described in Section 4.2 above. In this method, preferred surface treatment materials are low molecular weight fluorochemicals. Although typically not necessary, the resulting PST particles can optionally be screened and/or thermal fined.

An advantage of sintering PST particles formed by underwater pelletizing is that the surface treatment materials they comprise are typically located at or near the particles' exteriors. Without being limited by theory, this is believed to be due to a phenomenon known as "surface segregation," wherein a surface treatment material combined with a molten thermoplastic moves to the surface of the particles during or after their formation. Surface segregation typically occurs when the molecular weight and/or the surface energy of the surface treatment material is lower than that of the thermoplastic.

Thus, materials formed by sintering PST particles which comprise a thermoplastic and a low molecular weight fluorochemical will typically contain significant amounts of surface treatment material near or on the walls of the pores they contain, since these pore walls are formed by the particles' surfaces. Consequently, this method can be used to provide porous materials that contain surface treatment material located where it will most likely come into contact with liquids or vapors of water and/or oil.

Because this process can be used to position surface treatment materials within porous materials at locations where they are most effective, it can be used to avoid the inefficient, expensive, and potential overuse of surface treatment materials. Thus, PST particles can be made by combining the necessary amount of surface treatment material(s) with at least one thermoplastic resin.

As discussed above, if PST particles are formed from a mixture comprised of at least one thermoplastic and at least one surface treatment material, it is important to select the thermoplastic(s) and surface treatment material(s) to ensure that at least a substantial portion of the surface treatment material(s) will not decompose during the underwater pelletizing or sintering processes. This is easily done, however, as the decomposition temperatures of individual surface treatment materials are well known or can readily be determined by conventional means. For example, a surface treatment material can be heated to a specific temperature (e.g., the temperature at which the thermoplastic melts) and then allowed to cool, after which its hydrophobicity and/or olephobicity can be measured.

The flexibility of the processes of this invention allow the production of porous materials using innumerable thermoplastics and surface treatment materials. This and other novel and unexpected advantages of the invention are further illustrated by the following non-limiting examples.

5. EXAMPLES

5.1. EXAMPLE 1: COATING SINTERED POROUS THERMOPLASTICS

FC-722, a 2 weight percent fluorochemical acrylate solution in perfluorocarbon solvent, was adjusted to 0.5 weight percent with HFE-7 100, a hydrofluoroether solvent. Both chemicals are available from the Commercial Chemical Division of 3M Corporation. Two sintered porous thermoplastic sheets (X-7937 and X-9619, available from Porex Technologies, Fairbum, Ga.) having an average pore size of about 35 $\mu$m and 10 $\mu$m, respectively, were submerged in the fluorochemical acrylate solution for 10 seconds, taken out and dried in a flowing air environment for another 30 minutes.

Various physical properties of the treated and untreated porous materials are provided in the following tables.

| Component | Water Entry Pressure (psi)[a] | Air Flow Rate (ml/min)[b] | Pore Size ($\mu$m) | Oil Repellency[c] | Water Repellency[d] |
|---|---|---|---|---|---|
| Porex ® X-7937 | 1.0 | 154.18 | 35 | 4 | 320 |
| Porex ® X-7937 coated with 0.5% fluorochemical | 1.5 | 157.8 | 35 | 9 | 230 |
| Porex ® X-7937 coated with 0.3% fluorochemical | 1.2 | 156.8 | 35 | 8 | 230 |
| Porex ® X-9619 | 5.0 | 19.58 | 10 | 5 | 270 |
| Porex ® X-9619 coated with 0.5% fluorochemical | 7.5 | 18.0 | 10 | 10+ | 210 |
| Porex ® X-9619 coated with 0.3% fluorochemical | 7.2 | 19.2 | 10 | 10+ | 210 |

[a]Water Entry Pressure was measured according to ISO 811.
[b]Air flow test was measured under back pressure of 4.9 inches of water. Pore Size was measured according to ASTM D4 197.
[c]Oil repellency was determined by the "Kit Test" described as TAPPI Useful Method 557; the higher the value the better the repellency.
[d]Water repellency test was determined by the "Cobb Test" described as TAPPI-T44 1-05-77; the lower the value, the better the water repellency.

5.2 SURFACE TREATMENT USING SURFACE SEGREGATION

FX-1801, supplied in powder form from 3M Corp., was mixed with Escorene HX-0358 (Exxon Chemical Company) to 0.5 weight percent. The blend was mixed thoroughly through a dry blender.

After pre-blending, the blend was fed into a SLC-5 LPU underwater pelletizer available from Gala Industries Inc., Winfield, W.Va. The extruder used had three thermal zones set to 150° C., 165° C., and 180° C. The underwater pelletizer was fit with a die with 0.020 inch holes drilled into it. The blends were extruded through the die and into the cutter of the underwater pelletizer, which was rotating at 90–100 rpm to produce a material yield of approximately 15 lb/h of 0.0 inch diameter pellets.

The collected underwater pelletized powder was dried in a conventional oven at 80° C. for 4 hours. After it was completely dried, the powder was placed into a 0.25 inch flat mold, which was then heated to 140° C. using an electricity-heated plate for 10 minutes. After heating, the mold was cooled and the sintered porous thermoplastic material of the invention was removed from it.

The embodiments of the invention described above are intended to be merely exemplary, and those skilled in the art will recognize, or will be able to ascertain using no more than routine experimentation, numerous equivalents of the specific materials, procedures, and devices described herein. All such equivalents are considered to be within the scope of the invention and are encompassed by the appended claims.

What is claimed is:

1. A porous hydrophobic and/or oleophobic material having a surface energy of from about 5 dynes/$cm^2$ to about 30 dynes/$cm^2$ which comprises a porous thermoplastic substrate having a surface at least part of which is coated with a high molecular weight fluorochemical, wherein the substrate is made by sintering substantially spherical thermoplastic particles.

2. The material of claim 1 wherein the porous thermoplastic substrate is made of a thermoplastic selected from the group consisting of: ethylene vinyl acetate; ethylene methyl acrylate; polyethylenes; polypropylenes; ethylene-propylene rubbers; ethylene-propylene-diene rubbers; poly(1-butene); polystyrene; poly(2-butene); poly(1-pentene); poly(2-pentene); poly(3-methyl-1-pentene); poly(4-methyl-1-pentene); 1,2-poly-1,3-butadiene; 1,4-poly-1,3-butadiene; polyisoprene; polychloroprene; poly(vinyl acetate); poly(vinylidene chloride); and mixtures and derivatives thereof.

3. The material of claim 2 wherein thermoplastic is polyethylene.

4. The material of claim 3 wherein the polyethylene is ultra-high molecular weight polyethylene.

5. The material of claim 1 wherein the high molecular weight fluorochemical is selected from the group consisting of fluorinated acrylates, methacrylates, acrylic esters, and mixtures thereof.

6. The material of claim 5 wherein the high molecular weight fluorochemical is polymerized from a compound selected from the group consisting of:

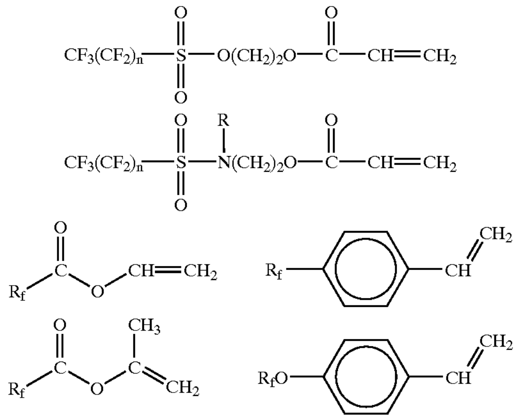

and mixtures thereof, wherein $R_f$ is $—CF_3(CF_2)_n$, n is an integer of from about 1 to about 18, preferably of from 1 to 4, and R is hydrogen or substituted or unsubstituted alkyl, aryl, or aralkyl.

7. The material of claim 6 wherein the high molecular weight fluorochemical is polymerized from a compound selected from the group consisting of:

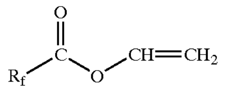

and

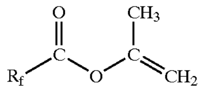

wherein $R_f$ is $—CF_3(CF_2)_n$, and n is an integer of from about 1 to about 18.

8. A porous hydrophobic and/or oleophobic material having a surface energy of from about 5 dynes/cm$^2$ to about 30 dynes/cm$^2$ which comprises a porous thermoplastic substrate having a surface at least part of which is coated with a high molecular weight fluorochemical, wherein the substrate is made by sintering thermoplastic particles formed by underwater pelletizing.

9. A process for making a porous hydrophobic and/or oleophobic material which comprises contacting a sintered porous thermoplastic substrate with a high molecular weight fluorochemical, wherein the substrate is made of polyethylene.

10. The product of the process of claim 9.

* * * * *